United States Patent [19]

Katsumoto et al.

[11] Patent Number: 5,660,761
[45] Date of Patent: Aug. 26, 1997

[54] MULTI-COMPONENT OXYGEN SCAVENGER SYSTEM USEFUL IN FILM PACKAGING

[75] Inventors: Kiyoshi Katsumoto, El Cerrito; Ta Yen Ching, Novato, both of Calif.; Leslie P. Theard, Houston, Tex.; Steven P. Current, Novato, Calif.

[73] Assignee: Chevron Chemical Company, San Ramon, Calif.

[21] Appl. No.: 388,815

[22] Filed: Feb. 15, 1995

[51] Int. Cl.$^6$ .......................... C09K 15/02; B32B 1/00; B32B 27/18
[52] U.S. Cl. ...................... 252/188.28; 428/35.3; 428/35.4; 428/35.8; 428/35.9; 252/380; 252/383
[58] Field of Search ............... 252/188.28, 380, 252/383; 428/215, 327, 35.3, 35.4, 35.8, 35.9

[56] References Cited

U.S. PATENT DOCUMENTS

| | | | |
|---|---|---|---|
| 5,021,515 | 6/1991 | Cochran et al. | 252/188.28 |
| 5,211,875 | 5/1993 | Speer et al. | 252/188.28 |
| 5,350,622 | 9/1994 | Speer et al. | 408/215 |
| 5,378,428 | 1/1995 | Inoue et al. | 252/188.28 |
| 5,425,896 | 6/1995 | Speer et al. | 252/188.28 |
| 5,498,364 | 3/1996 | Speer et al. | 252/188.28 |

FOREIGN PATENT DOCUMENTS

| | | |
|---|---|---|
| 0301719 | 2/1989 | European Pat. Off. . |
| 0335520 | 10/1989 | European Pat. Off. . |
| 0507207A3 | 10/1992 | European Pat. Off. . |

*Primary Examiner*—Shean C. Wu
*Attorney, Agent, or Firm*—Burns, Doane, Swecker & Mathis

[57] ABSTRACT

An improved oxygen scavenging system is provided. The system involves an oxygen scavenging phase containing at least one oxygen-scavenger and a second phase comprising at least one catalyst effective in catalyzing a scavenging reaction. The oxygen scavenging phase is substantially devoid of any catalyst of the scavenging reaction and the second phase is effectively separate from the oxygen scavenging phase. Nevertheless, the oxygen scavenging system provides excellent scavenging capabilities while avoiding many of the prior art problems, such as undesired oxidation during high temperature processing when the system is incorporated into a multi-layer film.

32 Claims, 5 Drawing Sheets

OUTSIDE OF PACKAGE

OXYGEN BARRIER LAYER
CATALYST LAYER
OXYGEN SCAVENGING LAYER
CATALYST LAYER
SEAL LAYER

INSIDE OF PACKAGE

- CATALYST LAYER
- OXYGEN SCAVENGING LAYER
- CATALYST LAYER

OUTSIDE OF PACKAGE

- OXYGEN BARRIER LAYER
- CATALYST LAYER
- OXYGEN SCAVENGING LAYER
- CATALYST LAYER
- SEAL LAYER

INSIDE OF PACKAGE

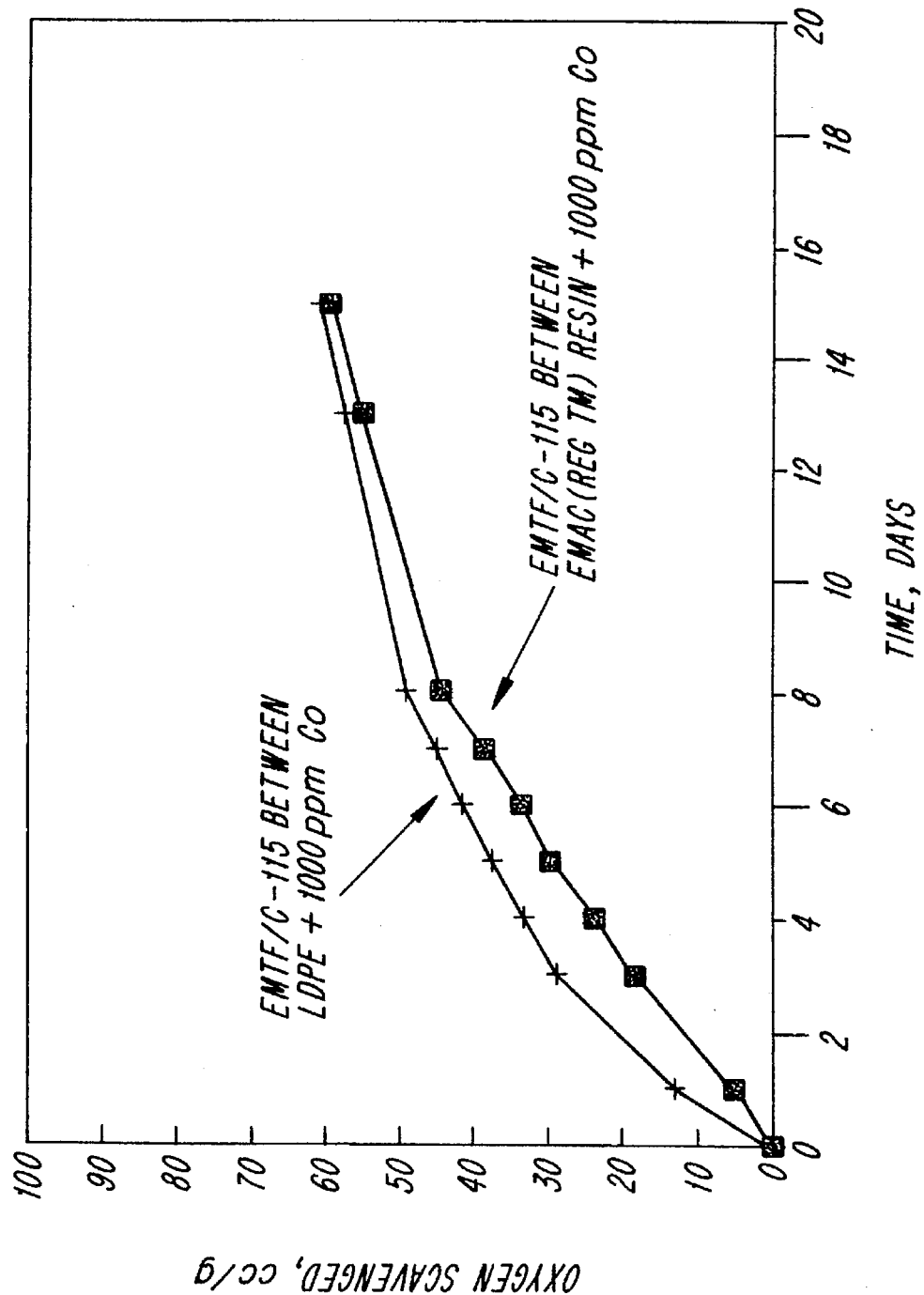

5,660,761

MULTI-COMPONENT OXYGEN SCAVENGER SYSTEM USEFUL IN FILM PACKAGING

BACKGROUND OF THE INVENTION

The present invention relates to an improved oxygen scavenging system which can be employed in multi-layer films, sheets, and molded or thermoformed shapes that find utility in low oxygen packaging for pharmaceuticals, cosmetics, oxygen sensitive chemicals, electronic devices, and in particular food packaging.

Organic oxygen scavenging materials have been developed partly in response to the food industry's goal of having longer shelf-life for packaged food.

One method which is currently being employed involves the use of "active packaging" where the package is modified in some way so as to control the exposure of the product to oxygen. Such "active packaging" can include sachets containing iron based compositions such as AGELESS™ which scavenges oxygen within the package through an oxidation reaction. However, such an arrangement is not advantageous for a variety of reasons including the accidental ingestion of the sachets or the oxygen-scavenging material present therein.

Other techniques involve incorporating an oxygen scavenger into the package structure itself. In such an arrangement, oxygen scavenging materials constitute at least a portion of the package, and these materials remove oxygen from the enclosed package volume which surrounds the product or which may leak into the package, thereby, in the case of food products, inhibiting spoilage and prolonging freshness.

Oxygen scavenging materials in this environment include low molecular-weight oligomers that are typically incorporated into polymers or can be oxidizable organic polymers in which either the backbone or, initially at least, side-chains of the polymer react with oxygen.

Such oxygen scavenging materials are typically employed with a suitable catalyst, e.g., an organic or inorganic salt of a transition metal catalyst such as cobalt. Examples of other suitable catalysts are organic and inorganic salts of iron, manganese, copper, and molybdenum. These materials are incorporated into one of the layers of the multi-layer films which are used in forming packaging materials.

While multi-layer films employing an oxygen scavenging material can be effective in the scavenging of oxygen, they can have certain disadvantages particularly in their preparation. For example, processability of a layer containing the oxidizable polymer and the catalyst can often be difficult.

That is, melt processing of this combination of components can be difficult, if not impossible, to accomplish without undesirable oxidation of the oxidizable polymer at the elevated temperature of the melt. Because of such premature oxidation during processing, the oxidizable resins which can be processed are somewhat limited.

One approach to solving this problem is to increase the concentration of stabilizers in the composition. High concentrations of stabilizers, however, tend to inhibit the desired oxygen scavenging reaction and also add to the overall cost of the film-forming composition.

Such problems can be particularly troublesome where the package is to be exposed to low temperatures, e.g., as for refrigerated or frozen foods. The scavenger needs to be both effective at low temperatures during the storage of packaged food, yet be capable of surviving melt processing at high temperatures. Unfortunately, it is difficult for a resin to meet such a combination of performance requirements.

Thus, the need still exists for an improved oxygen-scavenging system, particularly a system employed within multi-layer packaging films.

SUMMARY OF THE INVENTION

Among other aspects, the present invention is based upon the surprising discovery that the oxidation catalyst need not be intimately mixed with the oxidizable component to comprise an effective oxygen scavenging system. For example, it has been found that oxygen scavenging effectiveness is retained when the oxidation catalyst is in a phase or layer separate from the oxidizable component. Such a composition or system was surprisingly found to provide excellent oxygen scavenging capabilities, even under low temperature conditions. The composition or system also is processable as a melt at high temperatures, thus eliminating the key problems discussed above.

In particular, the present invention relates to an oxygen scavenging system comprising (A) an oxygen scavenging phase or structure which includes at least one highly oxidizable compound, and (B) at least one catalyst phase or layer which is effective in catalyzing the oxidation reaction of the oxidizable compound and which is effectively separate from, but in close proximity to the oxidizable compound. In a preferred embodiment for multilayer films, the catalyst is incorporated in a layer separate from a layer containing an oxygen scavenger. Most preferably, the catalyst is a cobalt catalyst and the catalyst containing layer is in contact with the layer containing the oxidizable compound.

BRIEF DESCRIPTION OF THE DRAWINGS

FIG. 3 shows the scavenging performance of a 3-layer film comprised of poly(ethylene-methyl acrylate-benzyl acrylate), EMBZ, coextruded between two layers each comprised of LDPE resin and 1000 ppm cobalt catalyst. FIG. 4 shows the scavenging performance of a 3-layer film wherein the oxidizable layer, a blend of EMTF with Hercules Piccolyte® C-115 (terpene resin), is coextruded between two layers, each comprised of Chevron EMAC®, poly(ethylene-methyl acrylate), resin containing 1000 ppm cobalt catalyst.

FIG. 5 graphically depicts the low temperature oxygen scavenging activity of two coextruded 3-layer films with the oxidation catalyst in the outer two layers and the oxidizable component in the middle layer.

DETAILED DESCRIPTION OF THE PREFERRED EMBODIMENTS

Figure 1A:
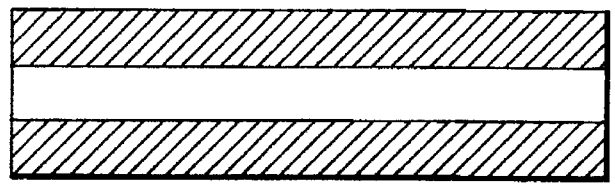
FIG. 1a illustrates an arrangement of layers in one embodiment of the present invention involving a multilayer film.

The present invention relates to a multi-component oxygen scavenging system which is useful in multi-layer packaging films. Preferably, the present invention is a system or composition which includes an oxygen scavenging phase containing at least one oxidizable component, and a second phase which is effectively separate from the oxygen scavenging phase and which contains at least one catalyst effective in catalyzing the oxygen scavenging reaction. While the second phase containing the catalyst is effectively separate from the oxygen scavenging phase, it is in sufficiently close proximity to be able to catalyze the reaction of the oxidizable compound with oxygen. Thus, excellent oxygen scavenging capabilities are achieved through the practice of the present invention.

By "effectively separate" is meant, for purposes of the present invention, that the catalyst containing phase is not sufficiently intimate with the oxidizable component of the oxygen scavenging phase to permit undesirable oxidation of the oxidizable component prior to its appointed oxygen scavenging role. This is particularly relevant in the melt processing of films, which occurs when a multi-layer film is prepared. Generally, this inhibition of undesirable oxidation requires at least a phase boundary between the catalyst and the oxidizable component. In a preferred embodiment, the catalyst is incorporated into a layer separate from the oxygen scavenging layer, with the layers in sufficiently close proximity in the structure to permit the catalyst to operate effectively as a catalyst for the oxygen scavenging reaction when the oxidizable compound interacts with oxygen. Among other factors, the present invention is based upon the surprising discovery that the catalyst and oxidizable compound can be separated and still operate efficiently. The catalyst and oxygen scavenger need not be intimately mixed or even in the same layer.

While the present invention is broader in scope than multi-layer films and is not intended to be limited thereto, the present invention will be described generally in connection with layers for convenience sake and due to the fact that a multi-layer film is a preferred embodiment.

A first aspect of the present invention, therefore, relates to the oxygen scavenging layer. This layer can be any layer that carries enough of an organic oxidizable material that the layer is capable of reacting with and scavenging at least 0.5 cc $O_2$/gram of oxygen scavenging material/day/atm. Preferably, the layer is capable of scavenging at least about 1, and more preferably at least about 5 cc $O_2$/gram of oxygen scavenging material/day/atm.

The oxidizable material may be blended into the layer or laminated or sprayed onto the layer, and/or may be a layer itself. For example, the oxidizable material may be an organic compound such as squalene or dehydrated caster oil as disclosed in EP 0 507 207 and U.S. Pat. No. 5,346,644, each of which is incorporated by reference in its entirety herein. This organic compound may be blended with a polymer carrier, which itself may or may not scavenge oxygen, or it may be coated onto a material such as aluminum foil or paper or even be incorporated into a material such as paper. The oxidizable material may be in localized areas on a layer, for example, it may be in a "patch" that is laminated to another layer.

In one embodiment, the oxidizable material is typically a polymer having oxidizable sites in the polymer. Examples of polymers having oxidizable sites include polybutadiene, polyisoprene and copolymers thereof, disclosed in U.S. Pat. Nos. 5,211,875 and 5,366,644; poly(meta-xylenediamine-adipic acid) (also known as MXD6), disclosed in U.S. Pat. Nos. 5,021,515 and 5,049,624 and EP 0 519 616; and poly(ethylene-methyl acrylate-benzyl acrylate), disclosed in U.S. Ser. No. 08/091,120, filed Aug. 12, 1993 now abandoned, inventors T. Ching, K. Katsumoto, S. Current and L. Theard, each of which is incorporated by reference in its entirety herein.

Poly(ethylene-alkyl acrylate-benzyl acrylate) can be made, for example, by solution transesterification.

An ethylene-alkyl acrylate copolymer such as ethylene-methyl acrylate copolymer is dissolved in an appropriate solvent such as decalin, and heated to and maintained at reflux in the presence of an effective amount of a transesterification catalyst, such as tetraethyl titanate or di-butyl tin laurate, and an alcohol containing a benzyl radical, such as benzyl alcohol. The solution is then cooled, and the polymer is precipitated in methanol and dried in a vacuum oven.

Accordingly, it is clear that the oxidizable polymers that can be employed within the present invention include those oxidizable polymers recognized in the art and, in fact, can include "highly active" oxidizable polymers such as poly(ethylene-methyl acrylate-benzyl acrylate), EBZA, and poly(ethylene-methyl acrylate-tetrahydrofurfuryl acrylate), EMTF, as well as poly(ethylene-methyl acrylate-nopol acrylate), EMNP. Blends of suitable polymers are also acceptable, such as a blend of EMTF and poly-d-limonene (a polyterpene available under the trademark Piccolyte® from Hercules).

A second aspect of the invention involves a catalyst which is introduced in a phase separate from the oxygen scavenger phase or layer. The catalyst which can be employed within the present invention includes any of those catalysts which are effective in initiating the scavenging reaction. Specific examples include metal catalysts, e.g., transition metal salts and in particular, cobalt compounds such as cobalt neodecanoate and cobalt stearate.

The manner in which the catalyst is introduced is not considered critical to the invention as long as it does not react with and/or deactivate the catalyst. For example, materials such as solvents for the catalyst can be used where the solvent/catalyst are then applied onto the oxygen scavenging layer by any suitable means, e.g., coating techniques such as spray coating, and extrusion coating or lamination.

In another alternative embodiment, the catalyst can be microencapsulated in a medium such as a polymer resin, which microcapsules are then introduced into the oxygen scavenging layer thereby creating the interfacial contact between the catalyst-containing phase and the oxygen scavenging phase with respect to each of the microcapsules.

Thus, in the oxygen scavenging systems of the present invention, depending on the medium and the application method employed, the catalyst-containing phase or layer may be "pure" catalyst or the catalyst may be extended by the medium.

Furthermore, it should be understood that actual contact between the catalyst containing phase or layer and the oxygen scavenging phase or layer is not needed, although it is preferred. The exact mechanism of how the catalyst, although effectively separated from the oxidizable compound, still manages to catalyze the reaction, whether by latent diffusion or another mechanism, is unknown. Nevertheless, when effectively separated, by at least a phase boundary, the disadvantages of undesired oxidization during melt processing are generally overcome, while still permitting one to realize excellent oxygen scavenging capabilities.

One embodiment of the present invention involves the incorporation of a catalyst into a polymeric material so as to form a catalyst-containing polymeric layer. This layer is then brought into contact with the oxygen scavenging material.

The particular polymeric material used is not critical as long as it does not deactivate the catalyst.

In one preferred aspect of this embodiment, the catalyst is introduced into any polymeric material which is largely incompatible with the catalyst. Preferably, such a catalyst-containing layer also has good adhesion so that upon contact with the scavenging layer, no additional tie layers are required.

In another aspect of this embodiment, the polymer can be selected such that it is non-oxidizable and has low permeability to by-products from the oxygen scavenging reaction so as to also serve as a barrier layer to such oxidation products.

Specific examples of suitable polymers in this regard include polyethylene, e.g., low density polyethylene (LDPE), high density polyethylene (HDPE), linear low density polyethylene (LLDPE), polypropylene, as well as copolymers, e.g., ethylene-methyl acrylate copolymers such as Chevron EMAC® resins, and ionomers thereof. Other suitable polymers include nylon 6, nylon 12, polyethylene terephthalate (PET), PVC, etc.

In this embodiment of the present invention, each of the two layers is stable under typical processing conditions and the two layers are contacted at, or near the end, of processing. The exact manner in which they are brought into contact is not critical to the invention. For example, they can be brought into contact in a co-extrusion process. Such a co-extrusion process is well recognized within the art and need not be described in detail here.

Alternatively, the layers may be brought into contact by way of a lamination process.

In particular, they are capable of being subjected to traditional steps such as activation or triggering. This activation or triggering can be performed by any means recognized in the art, e.g., UV triggering, thermal triggering, or the like.

Figure 1B:
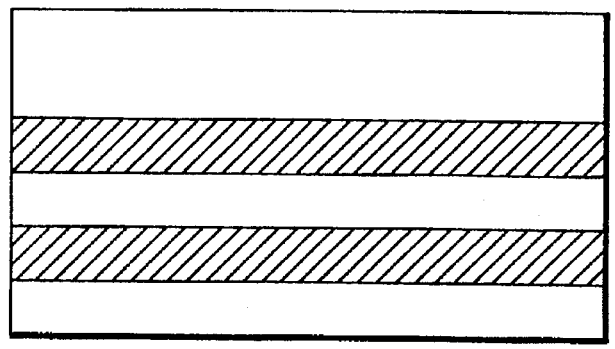
FIG. 1b illustrates another embodiment of the present invention in which the oxygen scavenging layer is combined with an oxygen barrier layer and a seal layer.

The catalyst-containing layer can be situated between the enclosed space or packaged volume from which oxygen is to be scavenged and the layer carrying an oxygen scavenging material, between the scavenging layer and the outside of the package, or both as illustrated in FIG. 1b.

In a preferred embodiment, the composition of this invention comprises several layers which have been coextruded or laminated together.

In a further embodiment of this invention, the multi-layer film includes at least three layers which have been coextruded or laminated together: an oxygen barrier layer, which has an OTR, Oxygen Transmission Rate, of no more than about 10 cc $O_2$/100 $in^2$ of oxygen barrier layer/day/atm; a layer carrying an organic oxygen scavenging material; and a catalyst-containing layer. Examples of $O_2$ barrier layers include ethylene-vinyl alcohol copolymer, poly(vinylidene chloride), PET and nylon.

Further, the structure can include a polymeric selective barrier layer as described in U.S. Ser. No. 08/304,303, filed Sep. 12, 1994; inventors: T. Y. Ching, K. Katsumoto, J. L. Goodrich, J. D. Gallet, which is incorporated herein by reference. These polymeric selective barrier layer functions as a selective barrier to certain oxidation products resulting from the scavenging reaction but not to oxygen itself. In one preferred embodiment, a layer is considered a polymeric selective barrier layer when it prevents at least half of the number and/or amount of oxidation products having a boiling point of at least 75° C. from passing through the polymeric selective barrier layer from the layer carrying the organic oxygen scavenging materials.

In addition, the film can include a seal layer which can be employed in sealing the package and which preferably comprises a heat-sealable material. Such layers are typically the innermost of the resulting package.

Moreover, the one or more layers of the present invention can include additives, e.g., antioxidants, stabilizers, plasticizers and UV sensitizers, which are well recognized within the art and as such need not be described in detail here.

The multi-component films employing the oxygen-scavenging system according to the present invention can be then employed in the production of packages, e.g., both rigid and flexible packages, by techniques which are well recognized within the art and need not be described in detail here.

Surprisingly, the oxygen scavenging composition and system according to the present invention can provide a scavenging capability which is as great as or even better then those scavenging systems in which the catalyst is introduced into the same layer as the scavenging material.

Furthermore, because the catalyst is introduced separately from the oxygen scavenger, this system is capable of avoiding the processing difficulties associated with traditional multi-layer films. Moreover, the oxygen scavenging capability of this system is capable of being employed in low temperature environments, e.g., refrigeration and freezing. Such can be very significant particularly in food packaging. The result can be a much longer shelf life and better flavor for the food when consumed. Additionally, storage stability of the film itself can be enhanced.

In general, the present invention relates to a composition and system which scavenges oxygen and is therefore useful in improving the shelf life of packaged oxygen-sensitive products such as pharmaceuticals, cosmetics, chemicals, electronic devices, health and beauty products, and pesticides, as well as food products. The present invention can also be used in applications other than films. For example, the present system can be used in moldings, coatings, patches, bottle cap inserts and molded or thermoformed shapes, such as bottles and trays. In all of these applications, the scavenger system effectively scavenges any oxygen, whether it comes from the headspace of the packaging, is entrained in the food or product, or is from outside the package.

The present invention will now be described further in terms of certain examples which are solely illustrative in nature and should in no way limit the scope of the present invention.

EXAMPLES

Example 1

Laminated Films

Low density polyethylene (Chevron PE 1017) resin pellets were coated with a hexane solution of cobalt neodecanoate to give 500 and 1000 ppm of Co. These resins were extruded in the Randcastle mini-extruder at 400° F. into 1–1.5 mil thick films. Similarly, poly(ethylene-methyl acrylate-tetrahyrdrofurfuryl acrylate), EMTF, was extruded into 1–2 mil thick film. EMTF was made by the transesterification of Chevron poly(ethylene methyl acrylate) EMAC® SP2260 resin (24% methyl acrylate) with tetrahydrofurfuryl alcohol. The tetrahydrofurfuryl ester content of the EMTF resin was 10.3%.

A 5–6 inch length of EMTF film was sandwiched between lengths of the LDPE+Co films. The films were placed between two Teflon® sheets which were placed between the hot (90° C.) platens of the PHI (Pasadena Hydraulics, Inc.) press.

After allowing the Teflon® sheets and film samples to equilibrate to the platen temperature for 5 minutes, the films were pressed at 10 tons pressure for 20 minutes. The samples were cooled on a cold press.

Figure 2:
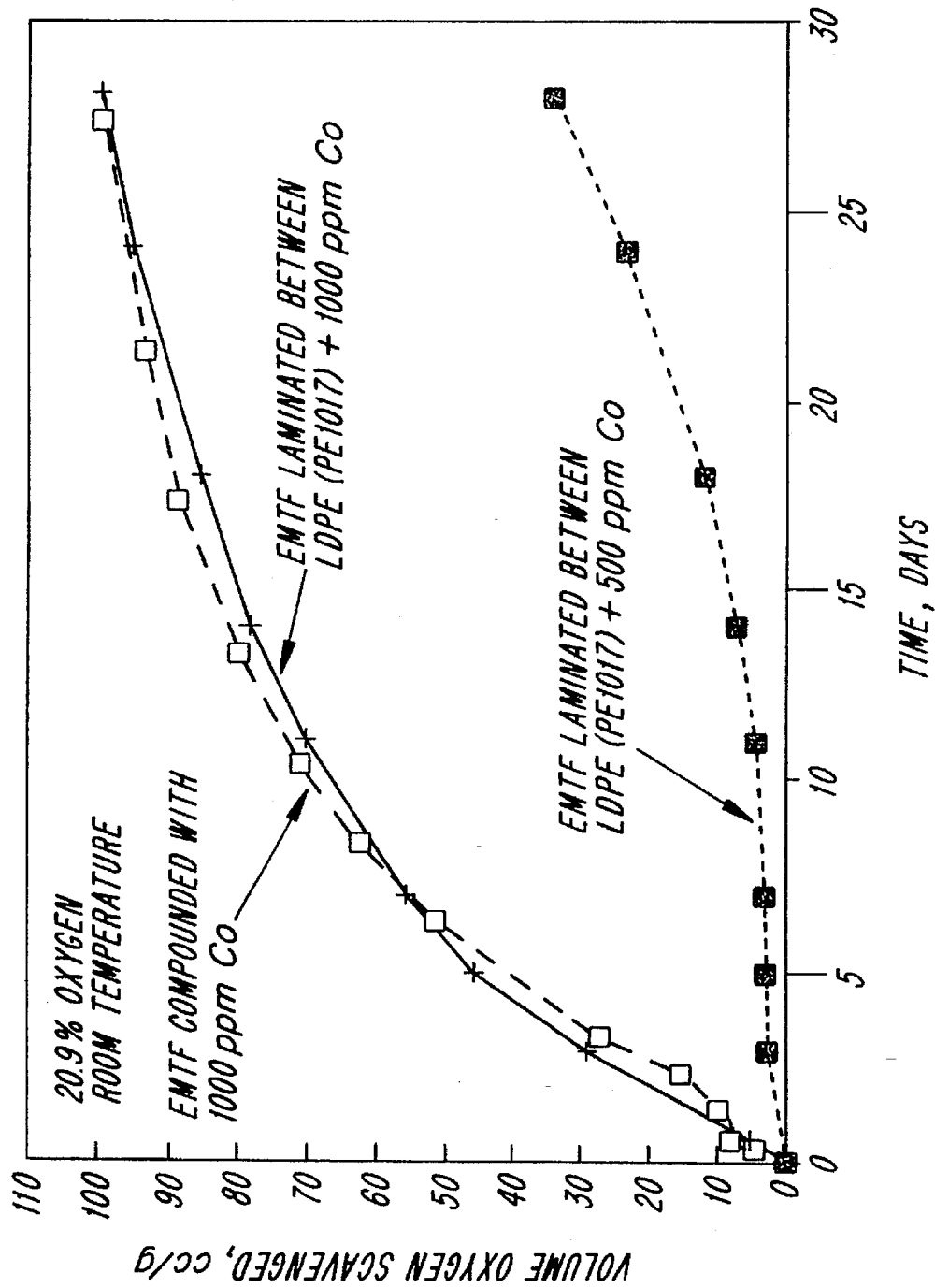
FIG. 2 shows the oxygen scavenging performance of a 3 layer film according to the present invention in which a layer of poly(ethylene-methyl acrylate-tetrahydrofurfuryl acrylate), EMTF, without cobalt has been laminated between LDPE layers containing 1000 ppm cobalt. Also shown in FIG. 2 for comparison is the oxygen scavenging performance of an EMTF monolayer film which contains 1000 ppm cobalt.

The laminated film samples were irradiated with a Blak-Ray UV lamp (254 nm, 5 mW/cm$^2$) for 20 minutes. Film samples were 5 inches away from the UV lamps. The irradiated samples were placed in 1 L bottles fitted with rubber septa. Headspace gas was analyzed in the Mocon HS 750 oxygen analyzer. The results are shown on FIG. 2. Test data are summarized in Table I.

Comparison Example 1

EMTF Compounded directly with Cobalt Catalyst

The same EMTF resin pellets used in Example 1 were coated with a hexane solution of cobalt neodecanoate to give 1000 ppm Co. The pellets were compounded and pelletized in a Haake twin screw extruder, then extruded in the Randcastle mini-extruder at 400° F. into 2–3 mil thick film.

A sample of the film was irradiated with UV and tested in the same manner as Example 1. The test data are summarized on Table I. The data are shown graphically on FIG. 2.

The laminated film of (LDPE+1000 ppm Co)/EMTF/ (LDPE+1000 ppm Co) scavenged oxygen at nearly identical rates to the films in which the cobalt was compounded directly into the EMTF resin. As expected, the laminate with 500 ppm Co in the LDPE layers was much less active.

Example 2

Coextruded Film, EMBZ between layers of LDPE+Cobalt

Poly(ethylene-methyl acrylate-benzyl acrylate), EMBZ, was made by the transesterification of Chevron poly (ethylene-methyl acrylate), EMAC® SP 2260 (24% methyl acrylate) with benzyl alcohol.

Chevron Low density polyethylene (LDPE), PE 1117B, was compounded with cobalt neodecanoate (1000 ppm cobalt). The EMBZ (5.3% benzyl ester), with no cobalt catalyst was coextruded between layers of the above LDPE+ 1000 ppm Co in the Randcastle mini-extruder at 400° F. to produce a 3-layer film approximately 3 mils thick (each layer about 1 mil).

Figure 3:
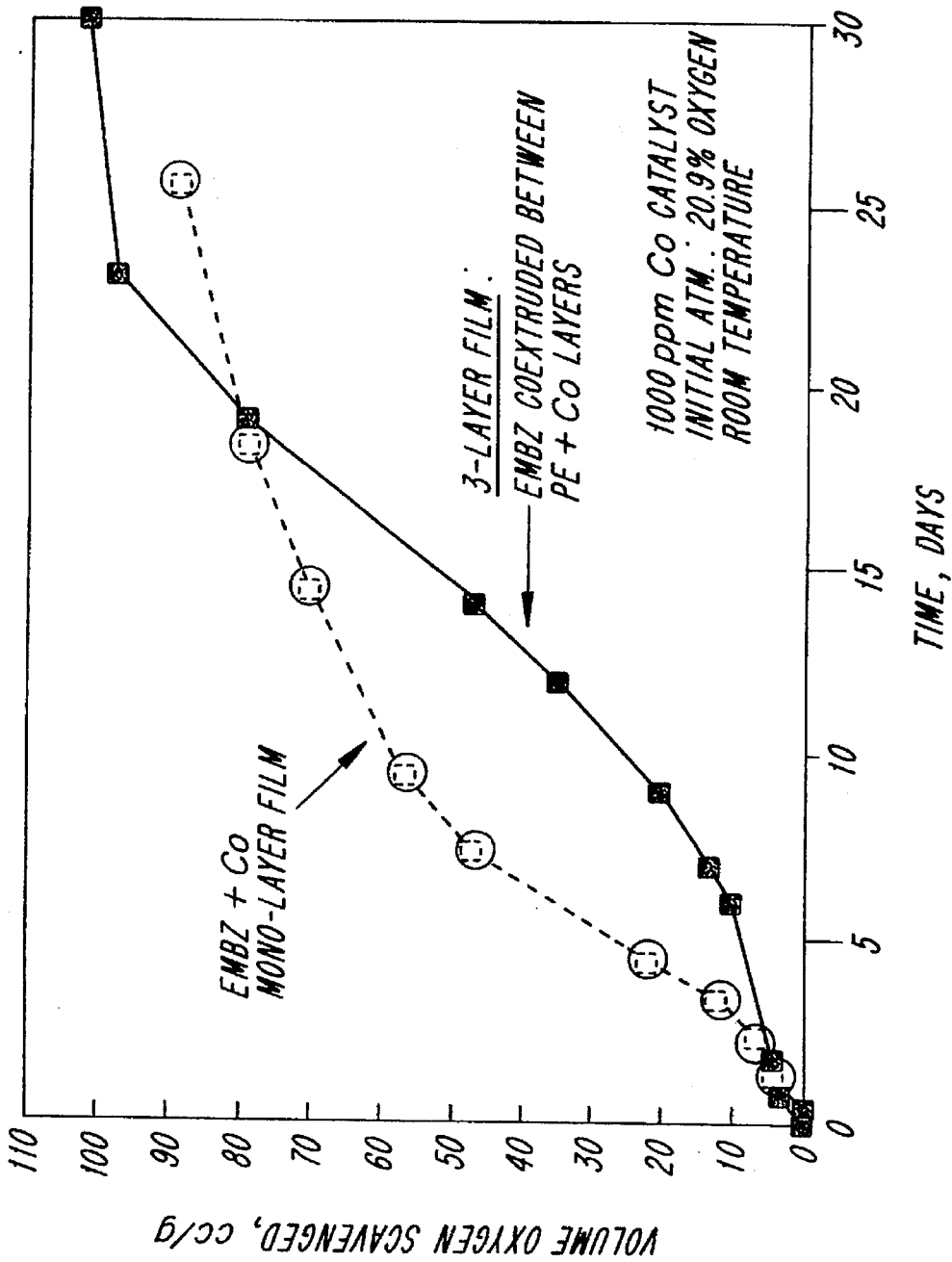
FIGS. 3 and 4 similarly show the oxygen scavenging performances of coextruded films according to the present invention.

The coextruded film was irradiated for 20 minutes with a Blak-Ray UV lamp and sealed into Aluminum foil pouches for oxygen scavenging tests. Test data are summarized in Table II and shown graphically in FIG. 3.

TABLE I

| Film Composition | Time, days | Oxygen Uptake, cc/g |
|---|---|---|
| Example 1 | 0.0 | 0.0 |
| Laminate of EMTF between LDPE (PE 1017) + 1000 ppm Co | 3.0 | 28.9 |
|  | 5.0 | 45.7 |
| 3-layer film (each layer about 1–1.5 mil thick) | 7.0 | 55.5 |
|  | 11.0 | 70.4 |
|  | 14.0 | 78.2 |
|  | 18.0 | 85.5 |
|  | 24.0 | 95.2 |
|  | 28.0 | 99.7 |
| Example 1 | 0.0 | 0.0 |
| Laminate of EMTF between LDPE (PE 1017) + 500 ppm Co | 3.0 | 2.5 |
|  | 5.0 | 2.7 |
| 3-layer film (each layer about 1–1.5 mil thick) | 7.0 | 2.8 |
|  | 11.0 | 4.1 |
|  | 14.0 | 6.8 |
|  | 18.0 | 11.5 |
|  | 24.0 | 23.2 |
|  | 28.0 | 33.9 |
| Comparison Example 1 | 0.0 | 0.0 |
| EMTF 43% conversion of MA | 0.2 | 2.99 |
| Directly compounded with 1000 ppm Co | 1.0 | 4.79 |
| (Cobalt neodecanoate) | 2.0 | 10.1 |
|  | 3.0 | 21.9 |
|  | 6.0 | 45.7 |
|  | 8.0 | 56.3 |
|  | 10.0 | 65.1 |
|  | 13.0 | 73.7 |
|  | 17.0 | 82.3 |
|  | 21.0 | 87.0 |
|  | 27.0 | 93.1 |

Comparison Example 2

Film made from EMBZ Compounded Directly with Cobalt Catalyst

The same EMBZ resin pellets used in Example 2 were coated with a hexane solution of cobalt neodecanoate to give 1000 ppm Co. The pellets were compounded and pelletized in a Haake twin screw extruder, then extruded in the Randcastle mini-extruder at 400° F. into 2–3 mil thick film.

A sample of the film was irradiated with UV and tested in the same manner as Example 1. The test data are summarized in Table II and shown graphically in FIG. 3. In this case the coextruded film showed a slightly longer induction period before oxygen scavenging commenced, but ultimate oxygen scavenging capacity was similar.

TABLE II

| Film Composition | Time, days | Oxygen Uptake, cc/g |
|---|---|---|
| Example 2 | 0.0 | 0.0 |
| Coextruded film/LDPE + 1000 ppm Co/ | 0.8 | 3.3 |
| EMBZ/LDPE + 1000 ppm Co | 1.7 | 4.3 |
|  | 6.0 | 10.2 |
|  | 7.0 | 13.2 |
|  | 9.0 | 20.1 |
|  | 12.0 | 34.8 |
|  | 14.0 | 47.0 |
|  | 19.0 | 79.2 |
|  | 23.0 | 97.7 |
|  | 30.0 | 102.4 |
| Comparison Example 2 | 0.0 | 0.0 |
| Monolayer film | 1.0 | 4.3 |
| EMBZ + 1000 ppm Co | 2.0 | 6.8 |
|  | 3.0 | 12.2 |
|  | 4.0 | 22.1 |
|  | 7.0 | 47.1 |
|  | 9.0 | 56.8 |
|  | 14.0 | 70.6 |
|  | 18.0 | 79.3 |
|  | 25.0 | 89.2 |
|  | 32.0 | 96.1 |

Example 3

Blend of EMTF+Piccolyte C-115 Coated with Cobalt catalyst

A 75:25 blend of EMTF from Example 1 and Hercules Piccolyte C-115 (polyterpene) was compounded and pelletized in the Haake twin screw extruder. The pellets were coated with a hexane solution of cobalt neodecanoate to give 1000 ppm cobalt. The cobalt-coated pellets could not be compounded in the Haake extruder because the highly reactive resins, in the presence of cobalt catalyst, thermally degraded under even mild compounding conditions. The cobalt coated pellets were extruded in the Randcastle mini-extruder at 400° F. into 2-3 mil thick films. The films were of very poor quality and contained many gels. They were dark gray rather than the light blue color typical of films containing 1000 ppm cobalt neodecanoate. The color indicated premature oxidation. The gels indicated cross-linking which is undesirable and would lead to poor processability.

A sample of the film was nevertheless UV irradiated and tested for oxygen scavenging performance in the same manner used for Example 1. Test data are summarized in Table III.

Example 4

EMTF/Piccolyte C-115 blend from Example 3 with no Cobalt coextruded between EMAC® Resin containing 1000 ppm Cobalt A 75:25 blend of EMTF with Piccolyte C-115 was compounded in the Haake twin-screw extruder without cobalt catalyst. Chevron EMAC® SP 2260 resin pellets were compounded with cobalt neodecanoate to give 1000 ppm Co. (Earlier experiments showed films made from this composition of EMAC® resin+Co did not oxidize readily under the oxygen scavenging test conditions used.) A 3-layer film comprised of a middle layer of the EMTF/C-115 blend coextruded between outer layers of the cobalt containing EMAC® resin was made in the Randcastle mini-extruder. The film was of excellent quality and showed no gels. It was about 3 mils thick, each layer about 1 mil thick.

Figure 4:
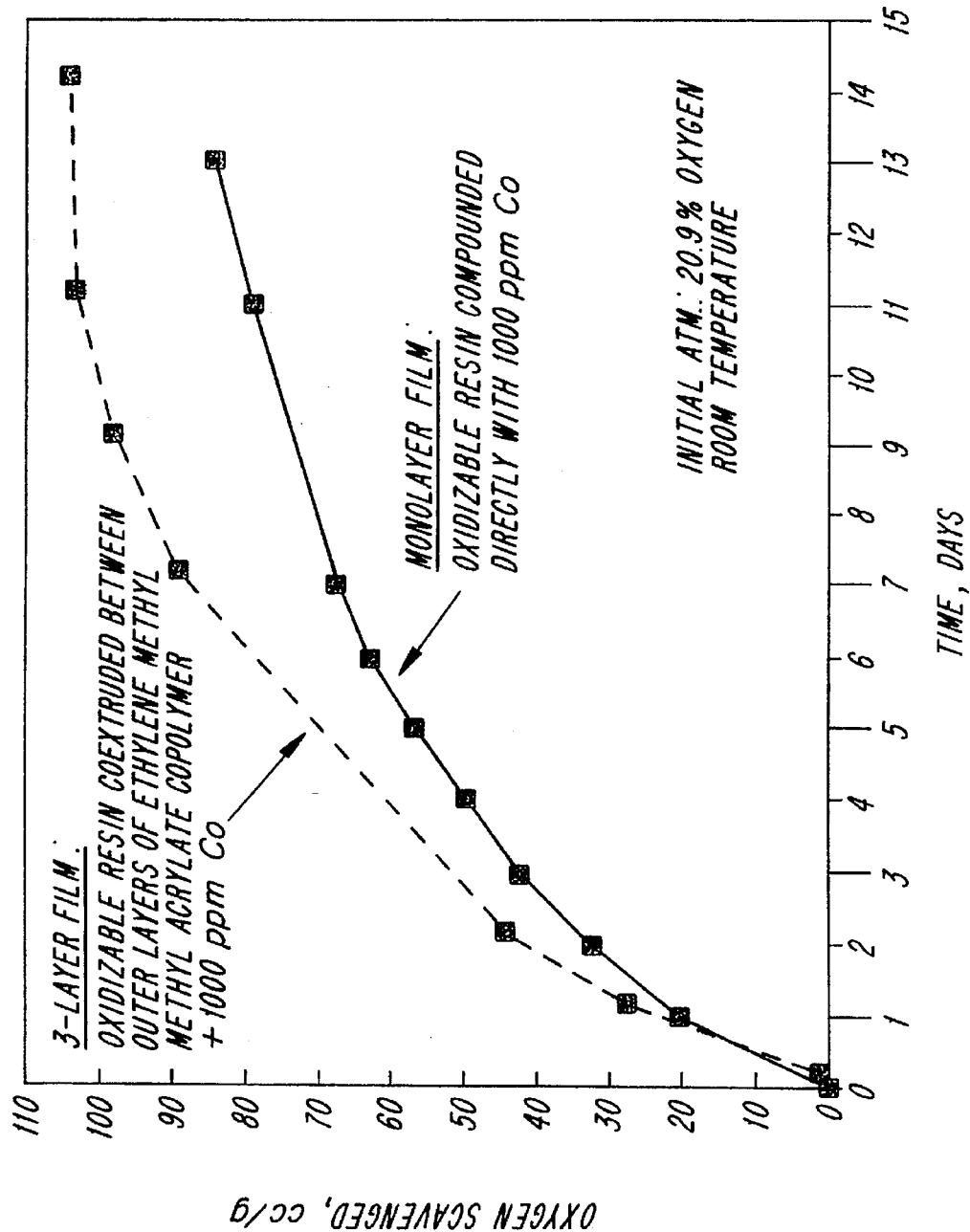

The 3-layer film was UV irradiated and tested in the same manner used for the other film samples. Test data are summarized in Table III and shown graphically in FIG. 4. The co-extruded film showed improved oxygen scavenging performance (faster rate, greater capacity) than the monolayer film in which the cobalt was directly compounded into the resin.

Example 5

Low temperature oxygen scavenging activity of EMTF/C-115 Oxygen Scavenging layer coextruded between Co catalyst containing film layers A sample of the 3-layer film from Example 4 was UV irradiated and tested for oxygen scavenging activity at 4° C. The data are included in Table III and shown graphically in FIG. 5.

Another sample of the 75:25 blend of EMTF with Piccolyte C-115 was coextruded between layers of LDPE containing 1000 ppm cobalt. (Earlier experiments showed films made from LDPE compounded with 1000 ppm cobalt did not readily oxidize under conditions used in the oxygen scavenging tests.) The film was UV irradiated and tested for oxygen scavenging activity at 4° C. The test data are summarized in Table III and shown graphically in FIG. 5.

These results show the 3-layer film with the blend of EMTF/C-115 coextruded between layers of cobalt containing polymer films is active at refrigerator temperatures. Furthermore, little difference in activity was noted between the use of LDPE or EMAC® resin as the catalyst carrier.

As can be seen, contrary to general expectations upon effectively separating the catalyst and oxygen scavenger compound, the products according to the present invention were actually superior to those of the comparative examples.

TABLE III

| Film Composition | Time, days | Oxygen Uptake, cc/g |
|---|---|---|
| Example 3 | 0.0 | 0.0 |
| 75:25 Blend of EMTF and Piccolyte C-115 | 1.0 | 20.2 |
| coated with 1000 ppm Co (Room temperature) | 2.0 | 32.1 |
|  | 3.0 | 42.0 |
|  | 4.0 | 49.4 |
|  | 5.0 | 56.4 |
|  | 6.0 | 62.6 |
|  | 7.0 | 67.0 |
|  | 11.0 | 78.6 |
|  | 13.0 | 83.6 |
| Example 4 | 0.0 | 0.0 |
| Coextruded film/EMAC ® resin + 1000 | 1.0 | 26.7 |
| ppm Co/75:25 EMTF-C115/ | 2.0 | 43.6 |
| /EMAC ® resin + 1000 ppm Co (room | 7.0 | 88.8 |
| temperature) | 9.0 | 97.9 |
|  | 11.0 | 103.0 |
|  | 14.0 | 103.8 |
|  | 21.0 | 103.8 |
| Example 5 | 0.0 | 0.0 |
| Coextruded film/EMAC ® resin + 1000 | 1.0 | 4.8 |
| ppm Co/75:25 EMTF-C115/ | 3.0 | 18.2 |
| /EMAC ® resin + 1000 ppm Co | 4.0 | 23.6 |
| (refrigerator temperature, 4° C.) | 5.0 | 29.5 |
|  | 6.0 | 33.5 |
|  | 7.0 | 38.4 |
|  | 8.0 | 44.2 |
|  | 13.0 | 55.5 |
|  | 15.0 | 59.4 |
| Example 5 | 0.0 | 0.0 |
| Coextruded film/LDPE + 1000 ppm Co/ | 1.0 | 12.8 |
| 75:25 EMTF-C115/ | 3.0 | 28.6 |
| /LDPE + 1000 ppm Co (refrigerator | 4.0 | 33.1 |
| temperature, 4° C.) | 5.0 | 37.5 |
|  | 6.0 | 41.4 |
|  | 7.0 | 44.9 |
|  | 8.0 | 49.3 |
|  | 13.0 | 57.5 |
|  | 15.0 | 60.8 |

The principles, preferred embodiments, and modes of operation of the present invention have been described by the foregoing. The invention, is not to be limited, by particular embodiments disclosed since they are only illustrative in scope.

Various modifications, substitutions, omissions, and the like may be made by those skilled in the art without departing from the spirit of the invention. Accordingly, it is intended that the scope of the present invention be limited solely by the following claims including equivalents thereof.

What is claimed is:

1. An oxygen scavenging system useful in multi-layer packaging film comprising, an oxygen scavenging layer comprised of at least one oxidizable compound, which layer is substantially devoid of any catalyst for an oxygen scavenging reaction; and a second layer separate from the oxygen scavenging layer and comprised of at least one catalyst effective in catalyzing an oxygen scavenging reaction.

2. The oxygen scavenging system according to claim 1, wherein the second layer comprises a polymeric material and at least one catalyst.

3. The oxygen scavenging system according to claim 2, wherein the polymeric material comprises polyethylene, or ethylene copolymers or ionomers thereof.

4. The oxygen scavenging system according to claim 2, wherein the oxidizable compound comprises a polymer having oxidizable sites.

5. The oxygen scavenging system according to claim 4, wherein the polymer is selected from among polybutadiene, poly(meta-xylenediamine-adipic acid), poly(ethylene-methyl acrylate-benzyl acrylate), poly(ethylene-methyl acrylate-nopol acrylate), and blends of these polymers with polyterpenes.

6. The oxygen scavenging system according to claim 4, wherein the catalyst is a transition metal salt.

7. The oxygen scavenging system according to claim 5, wherein the catalyst is a cobalt salt.

8. The oxygen scavenging system according to claim 2, wherein the polymer is non-oxidizable and has a low permeability to oxidization by-products.

9. A multi-layer film comprising the oxygen scavenging system according to claim 1, and at least one additional functional layer.

10. The multi-layer film according to claim 9, wherein the layer containing the catalyst comprises a polymeric material.

11. The multi-layer film according to claim 10, wherein the layer containing the catalyst is in contact with the oxygen scavenging layer.

12. The multi-layer film according to claim 11, wherein the polymeric material of the layer containing the catalyst comprises polyethylene, or ethylene copolymers or ionomers thereof.

13. The multi-layer film according to claim 11, wherein the oxidizable compound comprises a polymer having oxidizable sites.

14. The multi-layer film according to claim 13, wherein the polymer is selected from among polybutadiene, poly(meta-xylene diamine-adipic acid), poly(ethylene-methyl acrylate-benzyl acrylate), poly(ethylene-methyl acrylate-nopol acrylate), and blends of these polymers with polyterpenes.

15. The multi-layer film according to claim 9, wherein the catalyst is a transition metal salt.

16. The multi-layer film according to claim 9, wherein the catalyst is a cobalt salt.

17. The multi-layer film according to claim 9, wherein the at least one additional layer is selected from among oxygen barrier layers, polymeric selective barrier layers, and heat seal layers.

18. The multi-layer film according to claim 9, wherein the at least one additional layer is an oxygen barrier layer.

19. The multi-layer film according to claim 18, further comprising at least one polymeric selective barrier layer.

20. The multi-layer film according to claim 18, further comprising at least one heat seal layer.

21. An article comprising an oxygen scavenging system which comprises
an oxygen scavenging layer comprising at least one oxidizable compound, and a separate layer comprising a catalyst to catalyze reaction of the oxidizable compound with oxygen when the oxidizable compound interacts with oxygen.

22. The article of claim 21, wherein the article is a package.

23. The article of claim 22, wherein the oxygen scavenging system of the package comprises at least one additional layer selected from among oxygen barrier layers, polymeric selective layers, and heat seal layers.

24. The article of claim 22, wherein the article is a package with a food product located within the package.

25. The article of claim 22, wherein the article is a package containing a cosmetic, chemical, electronic device, pesticide or pharmaceutical.

26. The article of claim 21, wherein the article is a patch, bottle cap insert or molded or thermoformed shape.

27. The article of claim 26, wherein the molded or thermoformed shape is a bottle or tray.

28. A molding, coating, patch, bottle cap insert, bottle or tray containing the oxygen scavenging system of claim 1.

29. The oxygen scavenging system of claim 1, wherein the catalyst is comprised of cobalt stearate.

30. The multi-layer film of claim 9, wherein the catalyst is comprised of cobalt stearate.

31. The article of claim 21, wherein the catalyst is comprised of cobalt stearate.

32. A method for scavenging oxygen from a closed article which comprises incorporating into the article the oxygen scavenging system of claim 1.

* * * * *